United States Patent
Kim et al.

(10) Patent No.: US 10,812,423 B2
(45) Date of Patent: Oct. 20, 2020

(54) METHOD, APPARATUS, SYSTEM, AND NON-TRANSITORY COMPUTER READABLE MEDIUM FOR CHATTING ON MOBILE DEVICE USING AN EXTERNAL DEVICE

(71) Applicant: NAVER Corporation, Seongnam-si, Gyeonggi-do (KR)

(72) Inventors: Jookwan Kim, Seoul (KR); Hongsup So, Seoul (KR)

(73) Assignee: NAVER CORPORATION, Gyeonggi-Do (KR)

( * ) Notice: Subject to any disclaimer, the term of this patent is extended or adjusted under 35 U.S.C. 154(b) by 178 days.

(21) Appl. No.: 15/914,567

(22) Filed: Mar. 7, 2018

(65) Prior Publication Data

US 2018/0270175 A1    Sep. 20, 2018

(30) Foreign Application Priority Data

Mar. 15, 2017    (KR) .................. 10-2017-0032711

(51) Int. Cl.
G10L 13/00        (2006.01)
H04L 12/58        (2006.01)
(Continued)

(52) U.S. Cl.
CPC ............ *H04L 51/046* (2013.01); *G06F 40/58* (2020.01); *G10L 13/043* (2013.01); *G10L 15/22* (2013.01);
(Continued)

(58) Field of Classification Search
CPC .................................................. H04L 51/046
See application file for complete search history.

(56) References Cited

U.S. PATENT DOCUMENTS

2002/0186232 A1* 12/2002 Watanabe ............ G06Q 10/107
                                                    715/716
2005/0159833 A1*  7/2005 Giaimo .................. A63F 13/12
                                                    700/94
(Continued)

FOREIGN PATENT DOCUMENTS

JP        2017-505969 A      2/2017
KR     2002-0074304 A      9/2002
(Continued)

OTHER PUBLICATIONS

Japanese Office Action dated Oct. 16, 2018 for corresponding Japanese Patent Application No. 2018-040675.
(Continued)

*Primary Examiner* — Douglas Godbold
(74) *Attorney, Agent, or Firm* — Harness, Dickey & Pierce, P.L.C.

(57) ABSTRACT

Disclosed is a method, apparatus, system, and/or non-transitory computer readable medium for chatting on a mobile device using an external device. A chat method performed by a mobile device configured as a computer may include receiving a transmission input request for a signal including a send message through a preset button input of an external device; receiving, at the mobile device, the signal in response to the transmission input request; transmitting the send message to at least one counterpart that participates in a paired chatroom according to the signal; and outputting, to the external device, a received message that is received as a reply to the send message from the at least one counterpart through the chatroom.

20 Claims, 12 Drawing Sheets

(51) Int. Cl.
  *H04L 29/06* (2006.01)
  *H04W 4/80* (2018.01)
  *G10L 15/30* (2013.01)
  *G10L 13/04* (2013.01)
  *G10L 15/22* (2006.01)
  *G06F 40/58* (2020.01)
  *G10L 15/26* (2006.01)

(52) U.S. Cl.
  CPC .............. *G10L 15/30* (2013.01); *H04L 51/04* (2013.01); *H04L 65/403* (2013.01); *H04W 4/80* (2018.02); *G10L 13/00* (2013.01); *G10L 15/26* (2013.01)

(56) References Cited

U.S. PATENT DOCUMENTS

| | | | |
|---|---|---|---|
| 2008/0320085 A1* | 12/2008 | Bouilloux-Lafont | H04N 7/17318 709/206 |
| 2011/0143718 A1* | 6/2011 | Engelhart, Sr. | G10L 15/26 455/412.1 |
| 2012/0110099 A1* | 5/2012 | Fujihara | H04L 12/1818 709/206 |
| 2013/0238340 A1* | 9/2013 | Walsh | G10L 13/04 704/260 |
| 2015/0121230 A1* | 4/2015 | Kulavik | G06F 3/167 715/728 |
| 2015/0223272 A1* | 8/2015 | Parkinson | G10L 19/0017 455/41.2 |
| 2016/0358162 A1* | 12/2016 | Park | G06Q 20/3223 |
| 2017/0246545 A1* | 8/2017 | Wilhite | A63F 13/87 |
| 2018/0041453 A1* | 2/2018 | Zhe | H04W 4/80 |
| 2018/0063859 A1* | 3/2018 | Anantharaman | H04W 72/1215 |
| 2018/0069815 A1* | 3/2018 | Fontana | H04L 51/04 |
| 2019/0164563 A1* | 5/2019 | Volcker | G10L 21/0205 |

FOREIGN PATENT DOCUMENTS

| | | |
|---|---|---|
| KR | 2008-0074449 A | 8/2008 |
| KR | 2016-0147546 A | 12/2016 |
| WO | WO-2016/103736 A1 | 6/2016 |

OTHER PUBLICATIONS

Korean Office Action dated Mar. 19, 2018 for corresponding Korean Application No. 10-2017-0032711.

* cited by examiner

Connect to chatroom in which a function "listen to a chat in voice" is in use — 811

Message application
Home screen

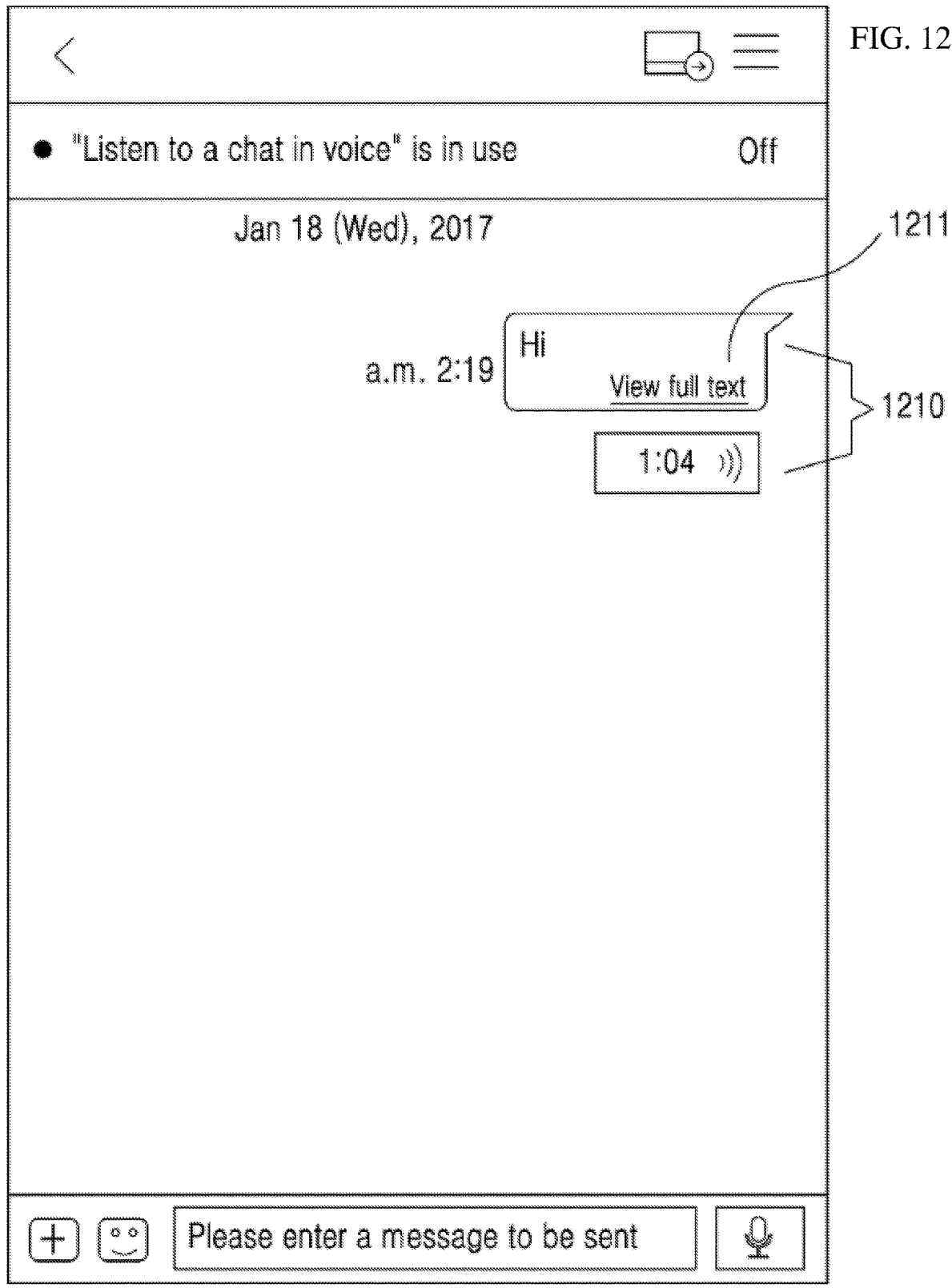

METHOD, APPARATUS, SYSTEM, AND NON-TRANSITORY COMPUTER READABLE MEDIUM FOR CHATTING ON MOBILE DEVICE USING AN EXTERNAL DEVICE

CROSS-REFERENCE TO RELATED APPLICATION(S)

This U.S. non-provisional application claims the benefit of priority under 35 U.S.C. § 119 to Korean Patent Application No. 10-2017-0032711 filed on Mar. 15, 2017, in the Korean Intellectual Property Office (KIPO), the entire contents of which are incorporated herein by reference.

BACKGROUND

Field

One or more example embodiments relate to a method, apparatus, system, and/or non-transitory computer readable medium for performing a chat function on a mobile device.

Description of Related Art

A mobile device, such as a smartphone, a wearable device, etc., capable of performing information communication through an Internet communication network may provide various additional services, in addition to a basic function, for example, a voice call and a short message service.

Currently, a mobile device provides a chat function that enables users to make conversations by exchanging messages, and includes a short range wireless communication device, for example, Bluetooth, and generally provides a function of exchanging data with an external device capable of performing a short range wireless communication.

SUMMARY

One or more example embodiments provide a method, apparatus, system, and/or non-transitory computer readable medium that may perform a desired chat process in a specific chatroom on a mobile device using an external device paired with the mobile device.

One or more example embodiments also provide a method, apparatus, system, and/or non-transitory computer readable medium that may transmit and receive a message through an external device without using a specific manipulation on a mobile device, such as a process of activating an application that is generally used to transmit and receive a message, a process of activating a chatroom in the application, and the like.

One or more example embodiments also provide a method, apparatus, system, and/or non-transitory computer readable medium that may receive a message from an external device in a transmission mode using a separate protocol signal, not in an open channel state with the external device, and may apply the received message as a send message of a specific chatroom.

According to an aspect of at least one example embodiment, there is provided a chat method performed at a mobile device, the method including receiving, using at least one processor, a request to transmit a send message, the request including the send message, in response to a desired button input of an external device, transmitting, using the at least one processor, the received send message to at least one counterpart mobile device that participates in a chatroom, and outputting, using at least one processor, to the external device a received message received through the chatroom from the at least one counterpart mobile device.

The request may be transmitted based on a desired protocol between the external device and the mobile device, and the receiving may include receiving the send message from the external device based on the desired protocol without using an interface associated with the chatroom.

The send message may include at least one of a speech message recorded at the external device and a text message in which the speech message is converted to text.

The send message may include a text message in which a speech message recorded at the external device is converted to text and then translated into a desired language.

The receiving may include receiving from the external device speech data of the send message from a recording start point in time to a recording end point in time based on the protocol, or receiving from the external device speech data from the recording start point in time using a streaming communication scheme.

The outputting of the received message may include outputting the received message through the external device without using an interface associated with the chatroom.

The outputting of the received message may include converting the received message to a desired language and transmitting the converted received message to the external device.

The external device may read the received message based on a text-to-speech (TTS) scheme in response to the received message being a text or may play the received message in response to the received message being a speech message.

The chat method may further include designating, using the at least one processor, the chatroom in a message application executed on the mobile device, and pairing the external device with the mobile device using the message application.

The chat method may further include displaying, using the at least one processor, information associated with the pairing with the external device on at least one of a home screen of the message application and the chatroom.

According to an aspect of at least one example embodiment, there is provided a non-transitory computer-readable recording medium storing computer readable instructions which, when executed by at least one processor, causes the at least one processor to perform a chat method in conjunction with a mobile device, the chat method including receiving a request to transmit a send message, the request including the send message, in response to a desired button input of an external device, transmitting the received send message to at least one counterpart mobile device that participates in a chatroom, and outputting, to the external device, a received message that is received through the chatroom from the at least one counterpart mobile device.

According to an aspect of at least one example embodiment, there is provided a chat system of a mobile device, the chat system including at least one processor configured to execute computer readable instructions to receive a request to transmit a send message, the request including the send message in response to a desired button input of an external device, transmit the received send message to at least one counterpart mobile device that participates in a chatroom, and output, to the external device, a received message received through the chatroom from the at least one counterpart mobile device. According to an aspect of at least one example embodiment, there is provided a device configured as a computer, the device including at least one processor configured to execute computer readable instructions. The at least one processor is configured to transmit, to a paired mobile device, a signal including a message through a preset button input without using a display interface; and receive and output a reply message to the message from the mobile device, and the message included in the signal is transmitted as a send message to at least one counterpart that participates in a chatroom paired with the device, and the reply message is output to the device as a received message that is received from the at least one counterpart as a reply to the send message.

According to some example embodiments, it is possible to perform a desired chat process in a specific chatroom on a mobile device using an external device paired with the mobile device.

Also, according to some example embodiments, it is possible to transmit and receive a message through an external device without using a specific manipulation on a mobile device, such as a process of activating an application that is generally used to transmit and receive a message, a process of activating a chatroom in the application, and the like.

Also, according to some example embodiments, it is possible to receive a message from an external device in a transmission mode using a separate protocol signal, not in an open channel state with the external device, and to apply the received message as a send message of a specific chatroom.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Various example embodiments will be described in more detail with regard to the figures, wherein like reference numerals refer to like parts throughout the various figures unless otherwise specified, and wherein:

FIGS. 8 and 9 illustrate examples of a state display process of a chat function using an external device according to at least one example embodiment; and FIGS. 10 through 12 illustrate examples of a process of applying a send message of a chatroom using an external device according to at least one example embodiment.

Figure 1:
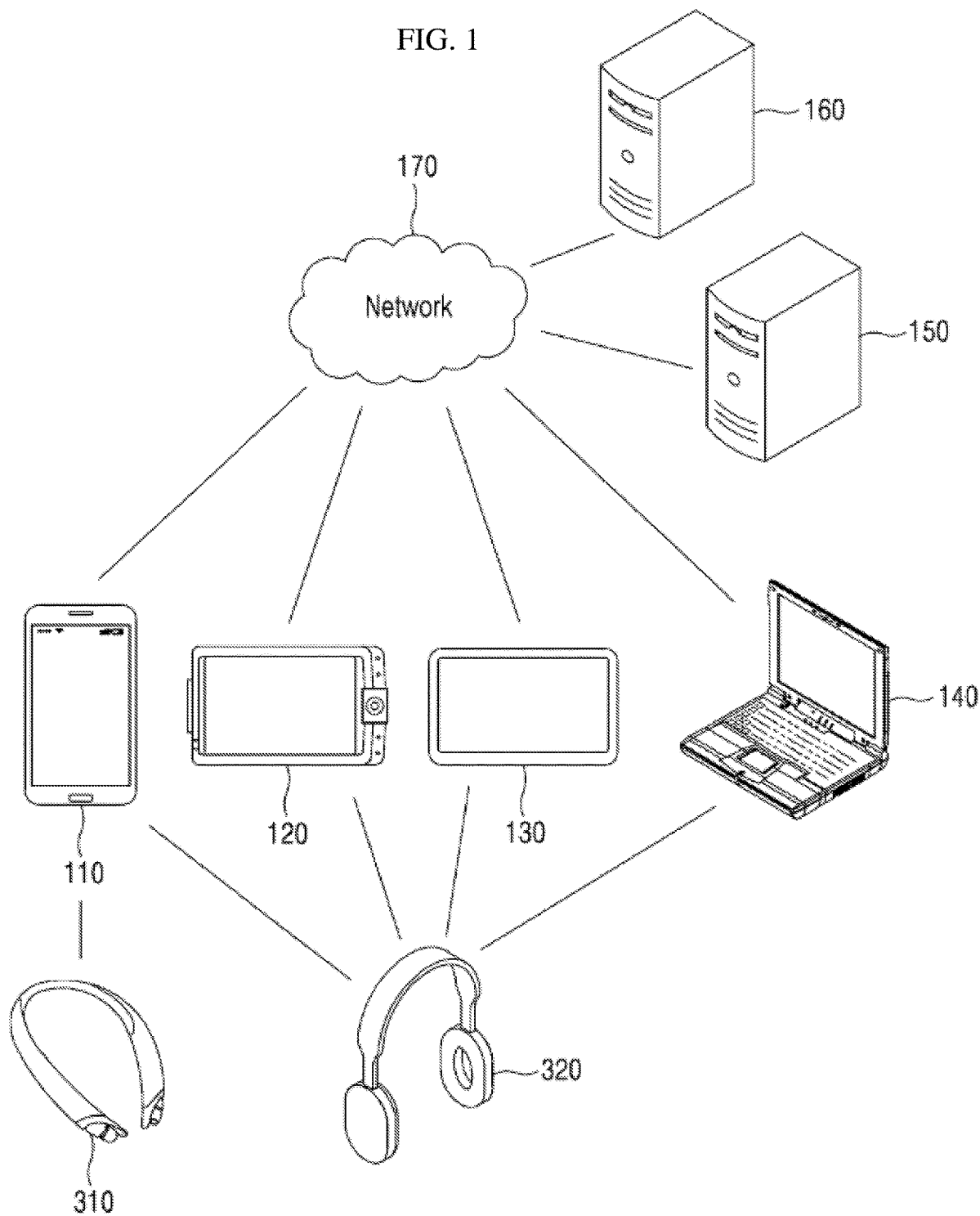
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

At least one example embodiment relates to a technique for performing a chat function of a mobile device.

At least one example embodiment disclosed herein may perform a desired chat process in a specific chatroom on a mobile device using an external device paired with the mobile device, and may achieve many advantages, such as convenience, efficiency, power saving, cost reduction, and the like.

Hereinafter, a method, apparatus, system, and/or non-transitory computer readable medium for performing a chat function using an external device according to some example embodiments will be described.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. Additionally, FIG. 1 also includes a plurality of external devices 310 and 320. FIG. 1 is provided as an example only and thus, the number of electronic devices, the number of external devices and/or the number of servers are not limited thereto and may be greater or lesser than the numbers illustrated in FIG. 1.

Each of the plurality of electronic devices 110, 120, 130, and 140 may be a mobile device that is configured as a computer device. For example, the plurality of electronic devices 110, 120, 130, and 140 may be a smartphone, a wearable device, a mobile phone, a tablet personal computer (PC), a laptop, a virtual reality device, an augmented reality device, a portable gaming console, and the like. For example, the electronic device 110 may communicate with other electronic devices 120, 130, and/or 140, and/or the servers 150 and/or 160 over the network 170 in a wired communication manner and/or in a wireless communication manner. Additionally, the plurality of electronic devices may each communicate with one or more external devices 310 and/or 320 over the network 170 and/or over a separate near field communication connection and/or network (e.g., Bluetooth, near field communication (NFC), ZigBee, IR, Z-Wave, WiFi, USB, etc.) in a wired and/or wireless communication manner. The external devices 310, 320 may be a Bluetooth head phone, an earphone, a speaker, a smart television and/or other smart device, a home automation device, an artificial intelligence (AI) embedded device, an Internet of Things (IoT) device, a smart device, a wearable device, etc.

The communication scheme is not particularly limited and may include a communication method that uses a near field communication between devices as well as a communication method using a communication network, for example, a mobile communication network, the wired Internet, the wireless Internet, a broadcasting network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides computer readable instructions, codes, files, contents, services, and the like through communication with the plurality of electronic devices 110, 120, 130, and/or 140 over the network 170.

For example, the server 160 may provide a file for installing an application to the electronic device 110 connected through the network 170. In this case, the electronic device 110 may install the application using the file provided from the server 160. Also, the electronic device 110 may access the server 150 under control of at least one program, for example, a browser or the installed application, or an operating system (OS) included in the electronic device 110, and may use a service and/or content provided from the server 150. For example, when the electronic device 110 transmits a service request message to the server 150 through the network 170 under the control of the application, the server 150 may transmit code corresponding to the service request message to the electronic device 110 and the electronic device 110 may provide content to a user by configuring and displaying a screen according to the code under control of the application.

Figure 2:
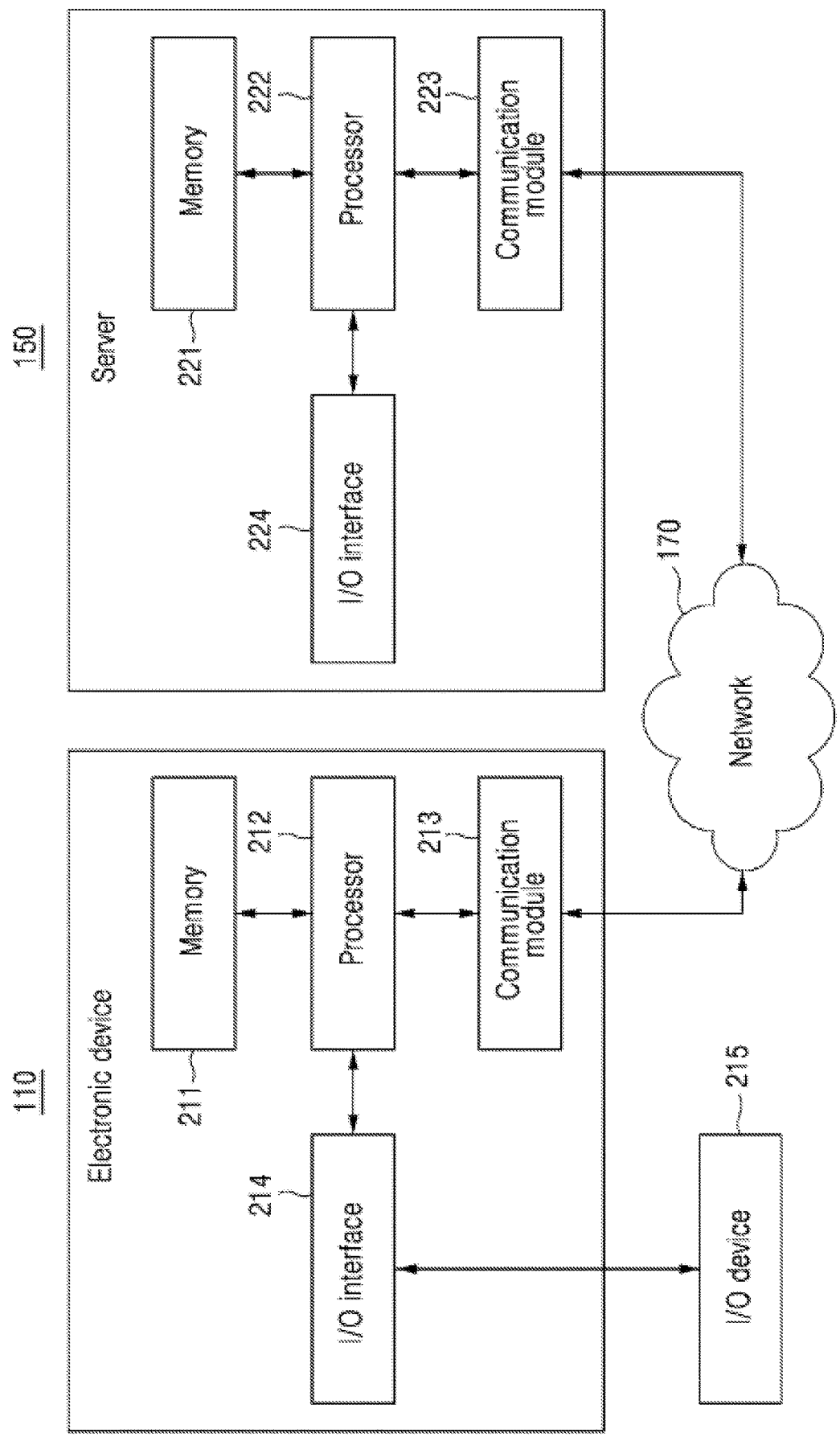
FIG. 2 is a block diagram illustrating an example of a configuration of an electronic device and a server according to at least one example embodiment.

FIG. 2 is a block diagram illustrating an example configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, and the server 150 may include a memory 221, at least one processor 222, a communication module 223, and an I/O interface 224. The memory 211, 221 may include a permanent mass storage device, such as random access memory (RAM), read only memory (ROM), a disk drive, a solid state drive, a flash memory, etc., as a non-transitory computer-readable storage medium. Also, an OS or at least one program code, for example, a code for an exclusive application and/or a browser installed and executed on the electronic device 110, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions (e.g., computer readable instructions) in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the at least one processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the at least one processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the at least one processor 212 or the memory 211, and content, a file, etc., may be stored in a storage medium further includable in the electronic device 110.

The I/O interface 214, 224 may be a device used for interface with an I/O device 215, 225. For example, an input device may include a keyboard, a mouse, a microphone, a camera, etc., and an output device may include a device, such as a display for displaying a communication session of the application, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the at least one processor 212 of the electronic device 110 may display a service screen configured using data provided from the server 150 or the electronic device 110, or may display content on a display through the I/O interface 214.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a motor for vibration, etc., which are generally included in the smartphone.

Herein, a mobile device may correspond to the electronic device 110 described with FIGS. 1 and 2, and may include, for example, a smartphone, a wearable device, a mobile phone, a tablet PC, a virtual reality device, an augmented reality device, a portable gaming console, etc. An external device may communicate with the mobile device through a short range wireless communication and may include, for example, a Bluetooth head phone, an earphone, a speaker, a smart television and/or other smart device, a home automation device, an artificial intelligence (AI) embedded device, an Internet of Things (IoT) device, etc. Further, any type of devices capable of communicating with the mobile device and including a microphone, a speaker, and an input button may be applied as the external device. Here, the external device may correspond to the electronic device 120 described with FIGS. 1 and 2, and may be provided in the same or similar internal configuration as that of the electronic device 110 described with FIG. 2.

Figure 3:
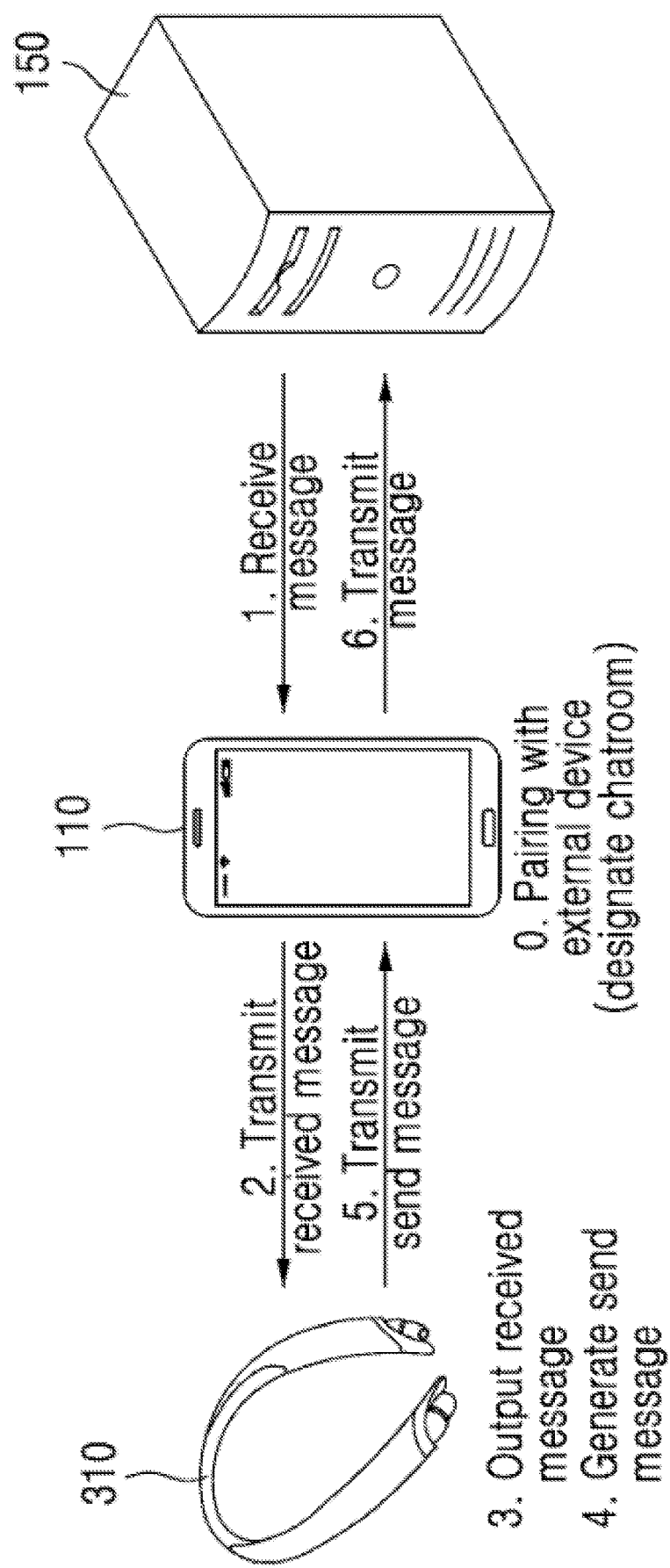
FIG. 3 illustrates an example of a chat scenario of a mobile device using an external device according to at least one example embodiment.

FIG. 3 illustrates an example of a chat scenario of a mobile device using an external device according to at least one example embodiment.

According to at least one example embodiment, the mobile device 110 may perform a pairing with the external device 310 and may designate a specific chatroom for interaction with the external device 310 within a message application including a chat function in operation 0. Here, as a system function of the mobile device 110, a pairing function with the external device 310 may be provided. Also, as a single function of the message application, a function of directly performing the pairing with the external device 310 in the chatroom may be provided.

In operation 1, the mobile device 110 may receive a message (e.g., incoming message) from the server 150 through the message application.

In operation 2, if the message received from the server 150 is a message of a specific chatroom, the mobile device 110 may transmit the received message (e.g., incoming message) as audio data to the external device 310. For example, if the received message is received in text form (e.g., the received message is in a text format and not an audio format), the mobile device 110 may convert the text of the received message into audio data. If the received message is received in audio form and/or the received message includes audio data, then the mobile device 110 forwards the received message to the external device 310. The mobile device 110 does not need to perform a separate manipulation to transmit the received message to the external device 310.

In operation 3, the external device 310 may output the message of the specific chatroom received from the mobile device 110 using speech (e.g., as an audible message, etc.).

In operation 4, the external device 310 may generate a message to be sent to the specific chatroom based on a speech input by a user. Here, in response to a speech input in a desired and/or predefined transmission mode, the external device 310 may generate a send message (e.g., outgoing message) based on the input speech. For example, the send message may include audio data that was recorded by one or more microphones included in the external device 310.

In operation 5, the mobile device 110 may receive the send message (e.g., outgoing message) transmitted by the external device 310 in the transmission mode according to a separate protocol signal. The message transmission is performed in the transmission mode according to the protocol signal desired and/or predefined between the mobile device 110 and the external device 310.

In operation 6, the mobile device 110 may apply the message transferred from the external device 310 as the send message of the specific chatroom and may transmit the send message of the specific message to the server 150. For example, based on user settings associated with the specific chatroom and/or the message application, the audio data included in the send message may be converted into text data (e.g., a text format) by the mobile device 110. Additionally, or alternatively, the mobile device 110 may include the original audio data of the send message received from the external device 310 with the text data, or may omit the conversion of the text data, and only forward the audio data as the send message. Here, the mobile device 110 does not need to perform a separate manipulation to receive the send message of the specific chatroom from the external device 310.

Accordingly, through the external device 310 paired with the mobile device 110, the chat function of the specific chatroom within the message application of the mobile device 110 may be performed. That is, it is possible to configure a speech relay role, such as a voice chat, a walkie-talkie, etc., using the external device 310 through an interface associated with the chatroom by designating the specific chatroom in the message application of the mobile device 110 and by inputting and outputting at least one message of the specific chatroom through the external device 310 paired with the mobile device 110.

In particular, it is possible to reduce power consumption (e.g., save on power consumption) of the mobile device 110 and to significantly enhance the independence of the external device 310 by directly processing output of a received message and input of a send message through the external device 310, without manipulating the mobile device 110, such as activating the message application or the specific chatroom in the mobile device 110, etc. That is, with respect to the specific chatroom that interacts with the external device 310, the message application may perform message transmission and reception of the specific chatroom through the external device 310 while operating as a background program in the mobile device 110, etc. Also, once the mobile device 110 is paired with the external device 310, the mobile device 110 may receive a send message in a transmission mode according to a separate protocol signal, instead of maintaining an open channel state. Accordingly, it is possible to reduce the power consumption (e.g., save the power consumption) of the mobile device 110, and to reduce, or alternatively, minimize incoming of noise excluding a message. Through this, it is possible to improve and/or guarantee quality of service (QoS). In a state in which the specific chatroom is paired with the external device 310, it is possible to transmit and receive at least one message using the external device 310 without using an interface in the specific chatroom (e.g., a separate interface, an external interface, etc.), and participation in a conversation may be further actively and spontaneously performed through the external device 310 without a particular notification of the specific chatroom regarding message transmission and reception.

In addition, herein, the external device 310 performs near field communication with the mobile device 110 and includes an input button as a basic component and does not require a separate display interface, such as a touch screen, a bezel, and the like. The input button provided to the external device 310 refers to a manipulation button for transmitting a desired and/or predefined protocol signal and may inclusively indicate a hardware button and/or a software configured button, such as a touch-type button, a virtual button/key, a softkey, etc. By simply transferring a signal including a message from the external device 310 to the mobile device 110 using the input button, the message included in the signal may be immediately applied as a send message of a chatroom that is paired with the external device 310. A message received at the chatroom as a reply to the send message may be transferred from the mobile device 110 and immediately output. During a process of generating and transferring the send message and outputting the message to be verifiable by the user, a separate manipulation is not required for the mobile device 110 and the external device 310. To generate the send message and to output the received message, a smart watch, a wearable device, a smartphone, a tablet, a home automation device, an AI embedded device, an IoT device, etc., may require manipulation through a display interface, such as a touch screen, a bezel, etc. Dissimilar thereto, one or more of the example embodiments enable the mobile device 110 and the external device 310 to transmit and receive a message through a protocol signal desired and/or predefined therebetween and thereby further simply and conveniently operate without manipulating a separate display interface.

Figure 4:
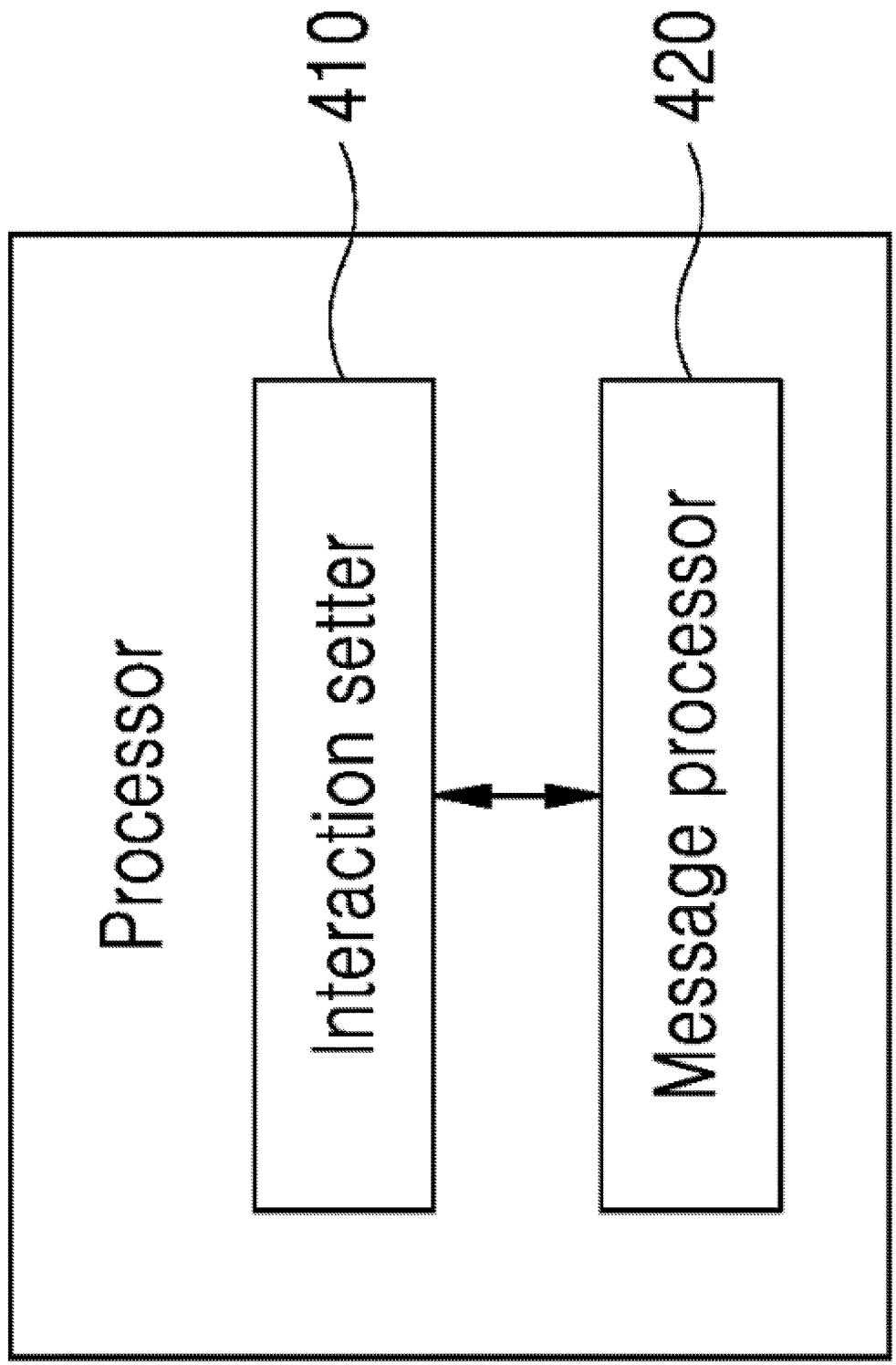
FIG. 4 is a block diagram illustrating an example of components includable in at least one processor of an electronic device according to at least one example embodiment.
Figure 5:
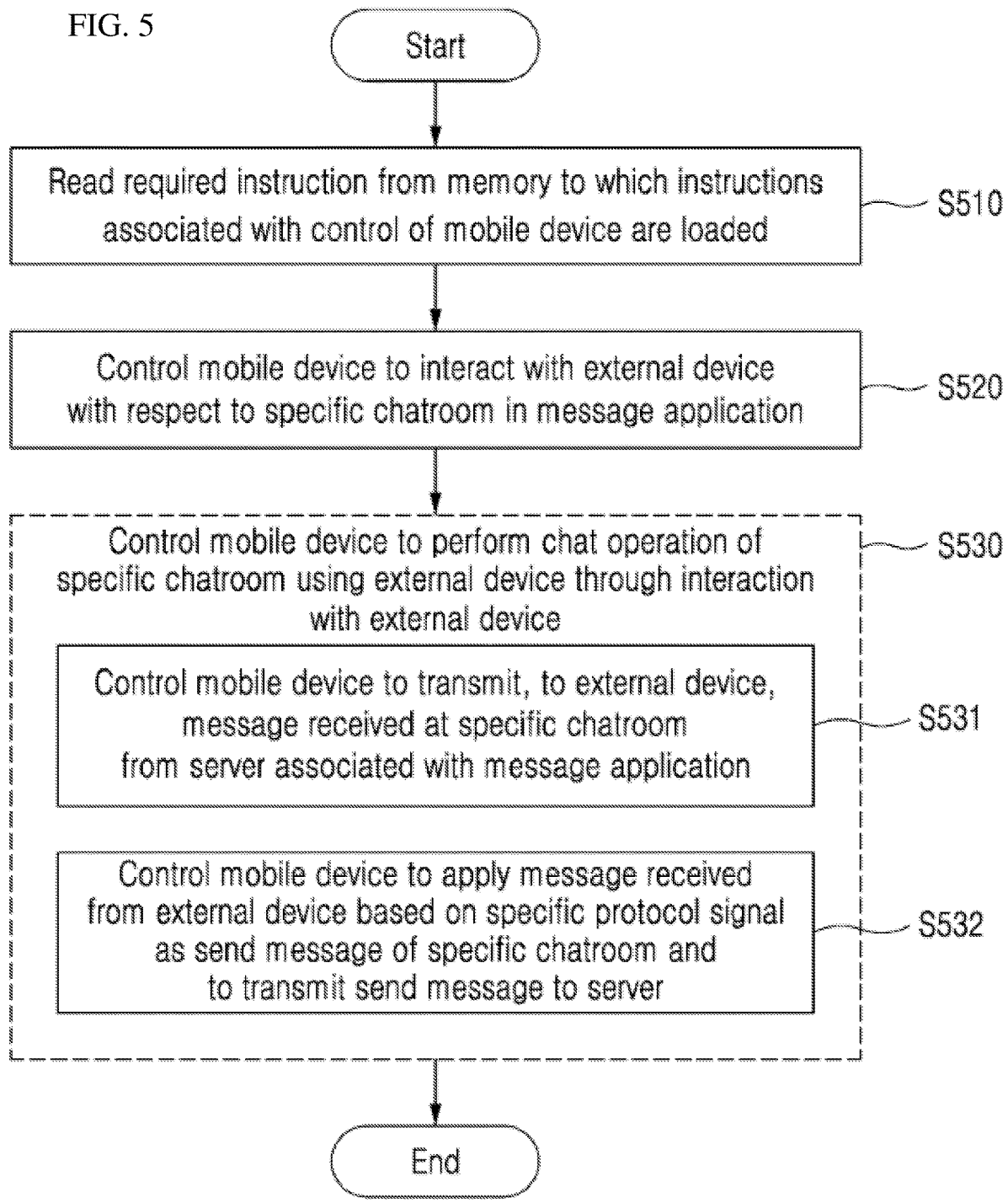
FIG. 5 is a flowchart illustrating an example of a method performed by an electronic device according to at least one example embodiment.

FIG. 4 is a block diagram illustrating an example of components includable in at least one processor of a mobile device according to at least one example embodiment, and FIG. 5 is a flowchart illustrating an example of a method performed by a mobile device according to at least one example embodiment.

A chat system configured as a computer may be configured in the mobile device 110. The chat system may be configured in a form of an application that is installed on the mobile device 110 and may provide a chat environment in a network environment in conjunction with the server 150. For example, the chat system configured on the mobile device 110 in response to an instruction provided from a message application installed on the mobile device 110 may perform a chat method using the external device 310.

Referring to FIG. 4, the at least one processor 212 of the mobile device 110 may include an interaction setter 410 and a message processor 420 as components, but is not limited thereto. The at least one processor 212 and the components of the at least one processor 212 may control the mobile device 110 to perform operations S510 through S530 included in the chat method of FIG. 5. Here, the at least one processor 212 and the components of the at least one processor 212 may be configured to execute instructions (e.g., computer readable instructions) according to code of at least one program and code of an OS included in the memory 221. Here, the at least one program may correspond to the aforementioned message application. Also, the components of the at least one processor 212 may be representations of different functions performed by the at least one processor 212 in response to a control instruction provided from the message application. For example, the interaction setter 410 may be used as a functional representation for the at least one processor 212 to operate for interaction between the mobile device 110 and the external device 310 in response to the control instruction.

In operation S510, the at least one processor 212 may read a required instruction from the memory 221 to which instructions associated with control of the mobile device 110 are loaded. That is, the at least one processor 212 may load, to the memory 211, a program code stored in a file of an application for the chat method using the external device 310. For example, the application, as the aforementioned message application, may include a control instruction to control the mobile device 110 to perform the chat method using the external device 310. In response to execution of the message application installed on the mobile device 110, the at least one processor 212 may control the mobile device 110 to load the program code from a file of the application to the memory 221.

Here, the at least one processor 212 and the interaction setter 410 and the message processor 420 included in the at least one processor 212 may be different functional representations of the at least one processor 212 to perform operations S520 and S530 by executing an instruction of a portion corresponding to the program code loaded to the memory 211. The at least one processor 212 and the components of the at least one processor 212 may control the mobile device 110 to perform operations S520 and S530. For example, the at least one processor 212 may control the mobile device 110 to perform a chat function through interaction between the mobile device 110 and the external device 310.

In operation S520, the interaction setter 410 may control the mobile device 110 to interact with the external device 310 with respect to a specific chatroom, or more than one specific chatroom, in the message application. If a user of the mobile device 110 designates the specific chatroom in the message application, the interaction setter 410 may set a "chat function using an external device" as an activation state (ON) with respect to the specific chatroom (e.g., desired chatroom). Here, the interaction setter 410 may retrieve devices (e.g., one or more external devices) capable of being paired with the mobile device 110 for the "chat function using an external device" and may display information associated with the retrieved devices (e.g., retrieved and/or detected external devices) on a screen (e.g., display) of the mobile device 110. In response to a selection of the user on at least one specific device from among the retrieved devices, the interaction setter 410 may perform a pairing with the selected specific device(s). If a previously connected device is included in a list of retrieved devices, the interaction setter 410 may automatically perform the pairing with the corresponding device. Accordingly, the interaction setter 410 may set a specific chatroom for the "chat function using an external device", and may perform the pairing with the external device 310 for the "chat function using an external device" with respect to the specific chatroom. Further, the interaction setter 410 may set a language to be used for chatting with respect to the "chat function using an external device" of the specific chatroom. For example, the interaction setter 410 may set a language for reading a received message of the specific chatroom based on a text-to-speech (TTS) scheme through the external device 310, based on a user setting of the mobile device 110.

Figure 6:
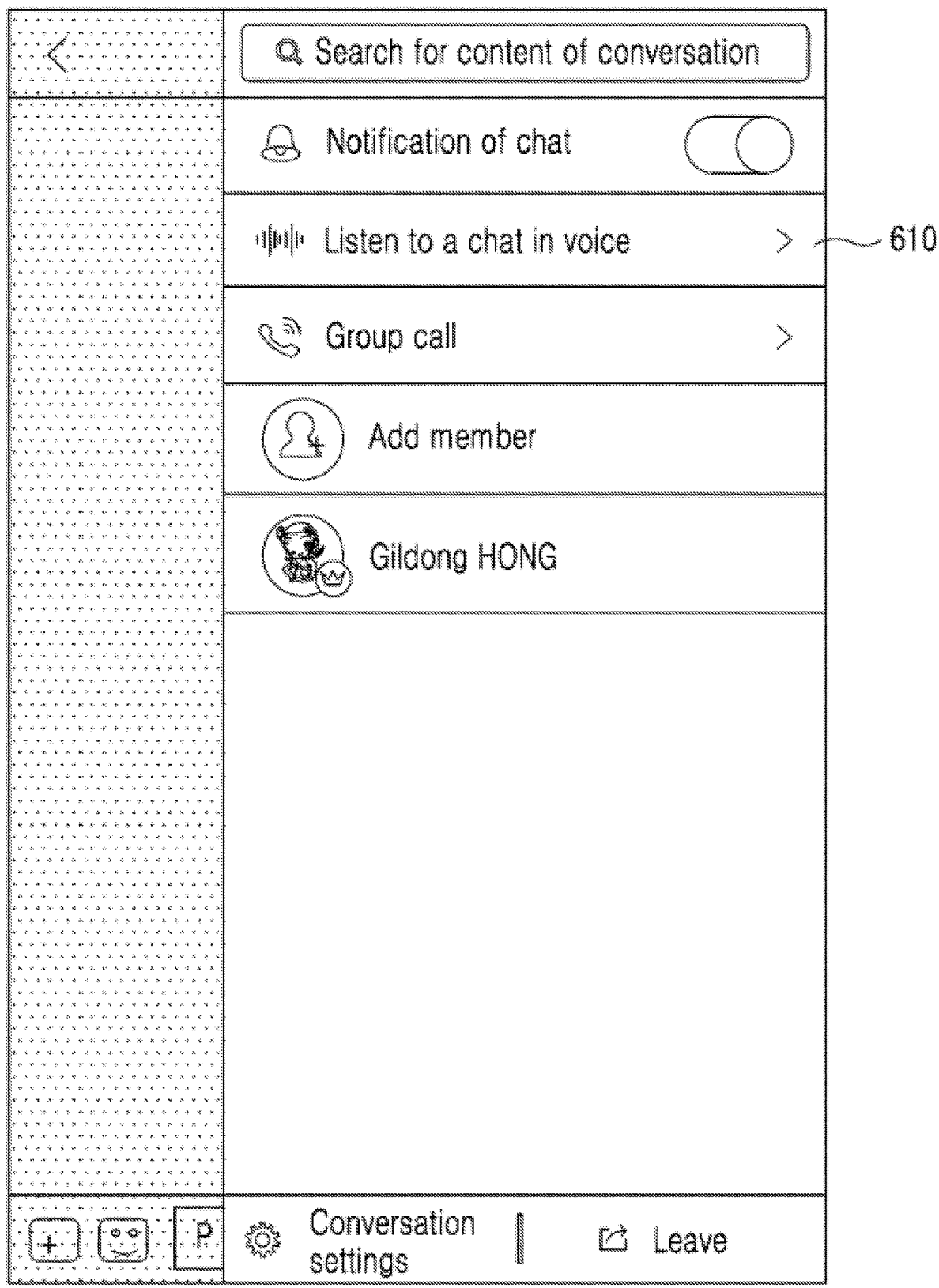
FIGS. 6 and 7 illustrate examples of a chatroom setting process for a chat function using an external device according to at least one example embodiment.
Figure 7:
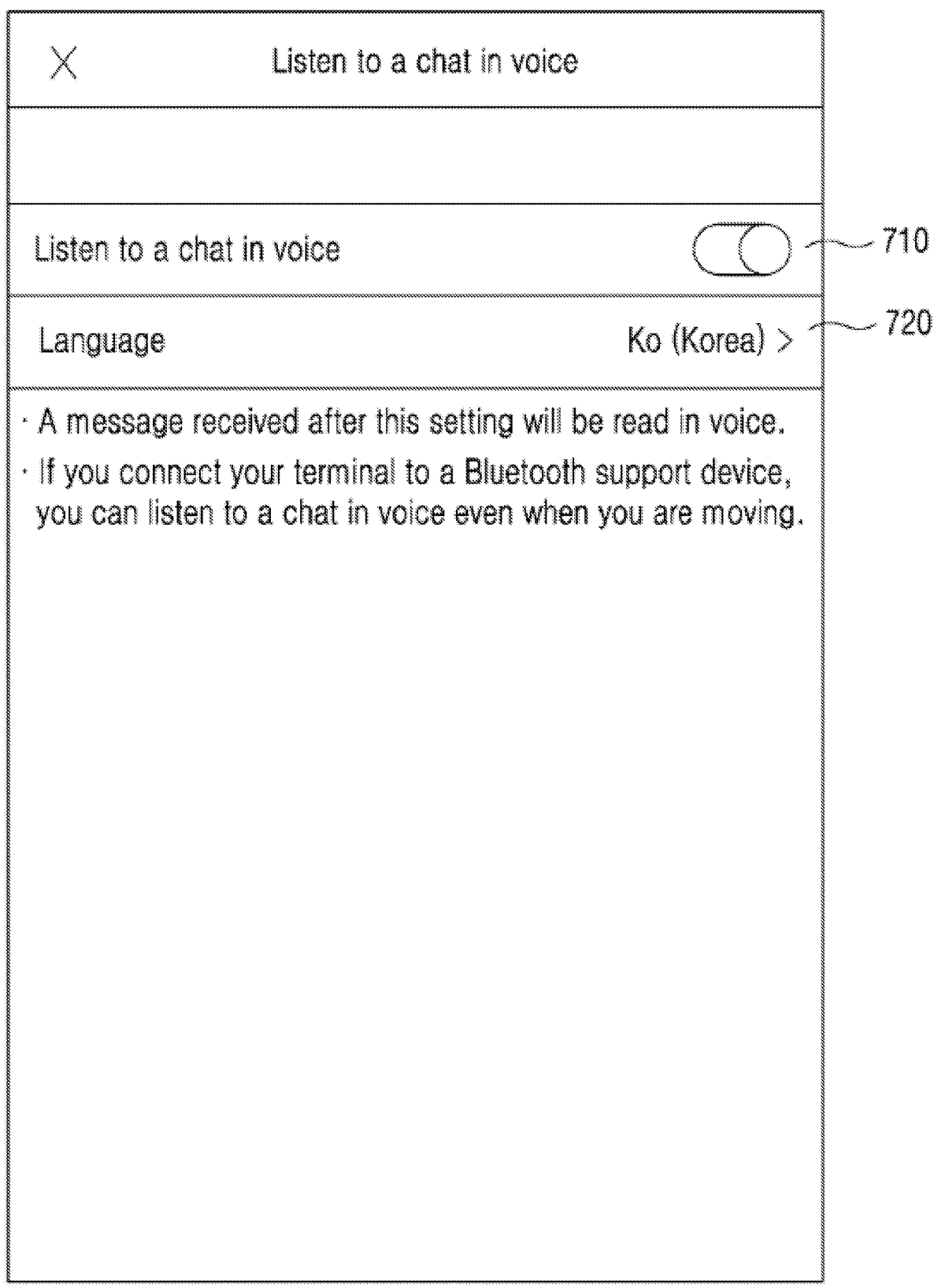

FIGS. 6 and 7 illustrate examples of a chatroom setting process for a chat function using an external device according to at least one example embodiment.

The at least one processor 212 may provide a user interface screen for environment settings with respect to each chatroom. For example, referring to FIG. 6, an environment setting screen 600 of a specific chatroom may include a user interface screen for verifying various types of environment settings including notification settings of the corresponding chatroom, information, etc. Here, the environment setting screen 600 may include a "listen to a chat in voice" menu 610 corresponding to a "chat function using an external device". In response to a selection of a user on the "listen to a chat in voice" menu 610 on the environment setting screen 600 of the specific chatroom, the environment setting screen 600 may be switched to a voice chat setting screen 700 of FIG. 7. For example, the voice chat setting screen 700 may include a voice chat setting menu 710 for setting activation (ON) or deactivation (OFF) of the "chat function using an external device" and a language setting menu 720 for setting a language of voice chat (e.g., set the language for the speech playback of the messages in the desired chatroom). The "chat function using an external device" may be settable with respect to a desired number of chatrooms, for example, a single chatroom, two chatrooms, etc. If another chatroom exceeding the desired number of chatrooms is activated, an activation state of a portion of the chatrooms may be released (e.g., the speech setting for one or more chatrooms may be deactivated based on desired criterions, such as priority settings associated with each of the chatrooms, the length of inactivity in the chatroom, the length of the user's inactivity in the chatroom, etc.) and then the setting may be performed.

To deactivate the "chat function using an external device" of the specific chatroom, the deactivation may be set by connecting to the voice chat setting screen 700 of the specific chatroom, which is similar to the activation setting process. Here, the pairing between the specific chatroom and the external device 310 may be terminated (e.g., disconnected, etc.).

Figure 9:
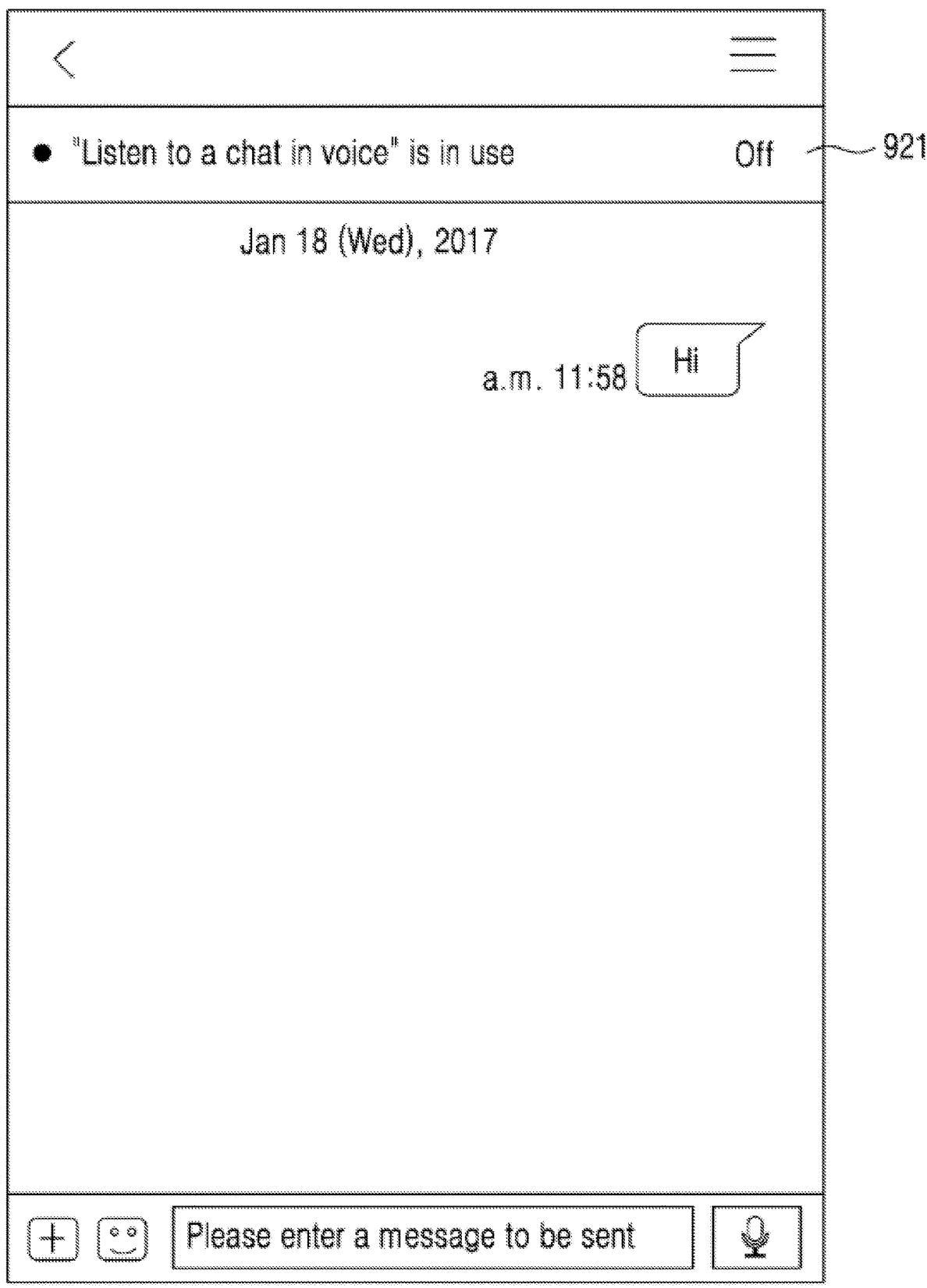

FIGS. 8 and 9 illustrate examples of a state display process of a chat function using an external device according to at least one example embodiment.

In response to activation of a "chat function using an external device" with respect to a specific chatroom, the processor 212 may display state information on at least one execution screen within a message application. For example, referring to FIG. 8, the at least one processor 212 may display state information 811 including a message indicating that the "chat function using an external device" is currently activated and a user interface for connecting to a chatroom in which the "chat function using an external device" is activated, at an upper end of a home screen 810 of the message application. As another example, referring to FIG. 9, the at least one processor 212 may display state information 921 including a message indicating that a "chat function using an external device" of a corresponding chatroom is activated and a user interface for switching the "chat function using an external device" of the corresponding chatroom to a deactivation state, at an upper end of a chatroom screen 920 in which the "chat function using an external device" is activated. The at least one processor 212 may transfer state information (e.g., activation or deactivation, etc.) of the "chat function using an external device" of the specific chatroom to the server 150 associated with the message application and may share the state information.

Referring again to FIG. 5, in operation S530, the message processor 420 may control the mobile device 110 to perform a chat operation of the specific chatroom using the external device 310 through interaction with the external device 310. Here, the message processor 420 may perform message transmission and reception of a corresponding chatroom using the external device 310 while operating as a background program, instead of executing the message application with respect to the specific chatroom in which the "chat function using an external device" is activated or connecting to the specific chatroom. The message processor 420 may process output of a received message and input of a send message through the external device 310 paired with the specific chatroom, without using an interface associated with the specific chatroom, with respect to the specific chatroom. That is, by simply manipulating the external device 310 without using an I/O interface provided from the specific chatroom, for example, a chatroom screen, a virtual keyboard of the chatroom, a speech input function, and/or a notification, etc., the message processor 420 may access the specific chatroom and may process the output of the received message and the input of the send message.

In operation S531, the message processor 420 may control the mobile device 110 to transmit, to the external device 310, a message received at the specific chatroom from the server 150 associated with the message application. If the message received from the server 150 is a message of the specific chatroom, the message processor 420 may directly transmit the received message to the external device 310 without using a separate manipulation at the mobile device 110. Accordingly, the external device 310 may output the received message of the specific chatroom transferred from the mobile device 110 in a speech form. If the received message is a text, the message processor 420 may read the received message based on a TTS scheme. If the received message is a speech message (e.g., an audio message, a video message including audio, etc.), the message processor 420 may automatically play the received message upon reception.

Here, if the pairing with the external device 310 is disconnected, the message processor 420 may directly output the received message from the mobile device 110. Once the message processor 420 is reconnected to the external device 310, the message processor 420 may automatically interact with the external device 310 with respect to the specific chatroom. If another message is received while the message is being played at the external device 310, the message processor 420 may place the other message in a standby state using a queue and may control the other message to be played once playing of the message is completed. Also, if another message is received during a recording operation at the external device 310, the message processor 420 may control the other message to be played once the recording operation in progress is completed. Also, the message processor 420 may convert the received message of the specific chatroom to a desired and/or preset language and may transfer the converted message to the external device 310. Also, if a message is received while another sound, such as music, video, etc., is being played at the external device 310, the message processor 420 may pause the sound being played and may initially play the message and resume the paused sound once playing of the message is terminated. Although the message processor 420 performs another operation in the message application or switches to another screen, for example, a different chatroom, the message processor 420 may continuously transfer a message to the external device 310 if the message is received at the specific chatroom.

In operation S532, the message processor 420 may control the mobile device 110 to apply the message received from the external device 310 based on a desired and/or specific protocol signal as a send message of the specific chatroom and to transmit the send message to the server 150.

The message processor 420 may receive a send message transmitted from the external device 310 in a transmission mode according to a separate protocol signal and may immediately apply the send message as the send message of the specific chatroom. The external device 310 may record a speech message based on a protocol specified as a recording start/end/cancel, and may automatically transmit the recorded message as the send message of the designated chatroom. The message processor 420 may immediately transmit the recorded message as the send message of the corresponding chatroom using a simple manipulation of the external device 310, without using a separate manipulation or control in the message application, that is, without performing a process of executing the message application and connecting to the specific chatroom. Accordingly, the send message of the specific chatroom may be received as an input using the external device 310 without using a manipulation at the mobile device 110, and the message may be immediately transmitted to all of the users participating in the chatroom.

With respect to the "chat function using an external device", a protocol for a message transmission may be desired and/or predefined by generating a new button of the external device 310 or using a portion of existing buttons. For example, if the user selects a fast forward (FF) button twice on a Bluetooth head phone, it may correspond to "speech recording start". If the user selects the FF button twice during the speech recording, it may correspond to a "speech recording end". If the user selects the FF button once during the speech recording, it may correspond to a "speech recording cancel". That is, if data is transferred from the external device 310 based on the desired and/or predefined protocol, the message processor 420 may recognize it as a message transmission mode in the external device 310 and may immediately apply the message transferred from the external device 310 in the corresponding mode as a send message of the specific chatroom.

As described above, the message processor 420 may receive a transmission input request for a signal (e.g., a signal indicating a request to transmit a send message) including the send message from the external device 310 through user input of the desired and/or preset button of the external device 310 and may receive the signal including the send message in response to the transmission input request. In other words, a user presses and/or otherwise engages the desired button of the external device 310, which causes the external device 310 to transmit a signal to the message processor 420 of the mobile device 110 including a send message to be transmitted to the server 150 and/or a counterpart mobile device that is a participant in the selected chatroom, such as electronic device 120. Here, the signal transmitted and/or transferred in response to the input of the button may be transmitted based on a protocol desired and/or predefined between the mobile device 110 and the external device 310. The message processor 420 may immediately transmit the send message included in the signal to at least one counterpart mobile device that participates in a paired chatroom in response to the signal that is transferred in response to the input of the button of the external device 310. If a reply message to the send message is received from at least one counterpart that participates in the chatroom paired with the external device 310, the message processor 420 may immediately output the received message to the external device 310.

As an example of a scheme of transferring a message from the external device 310 to the mobile device 110, full data from a recording start point in time to a recording end point in time may be transferred from the external device 310 to the mobile device 110. As another example, the external device 310 may convert, to a text in real time, data from a recording start point in time of a speech and may transfer the converted text to the mobile device 110 using a streaming scheme. As another example, the external device 310 may convert, to text, the full data from the recording start point in time to the recording end point in time and may transfer a text conversion result to the mobile device 110, or may transfer the full data and the text conversion result to the mobile device 110. An entity that performs an operation of converting a speech message to a text is not limited to the external device 310, and may be configured in one of the external device 310, the mobile device 110, and the server 150. Also, the text conversion result may include a result of converting the speech message to the text and then to a language set by the user.

Figure 10:
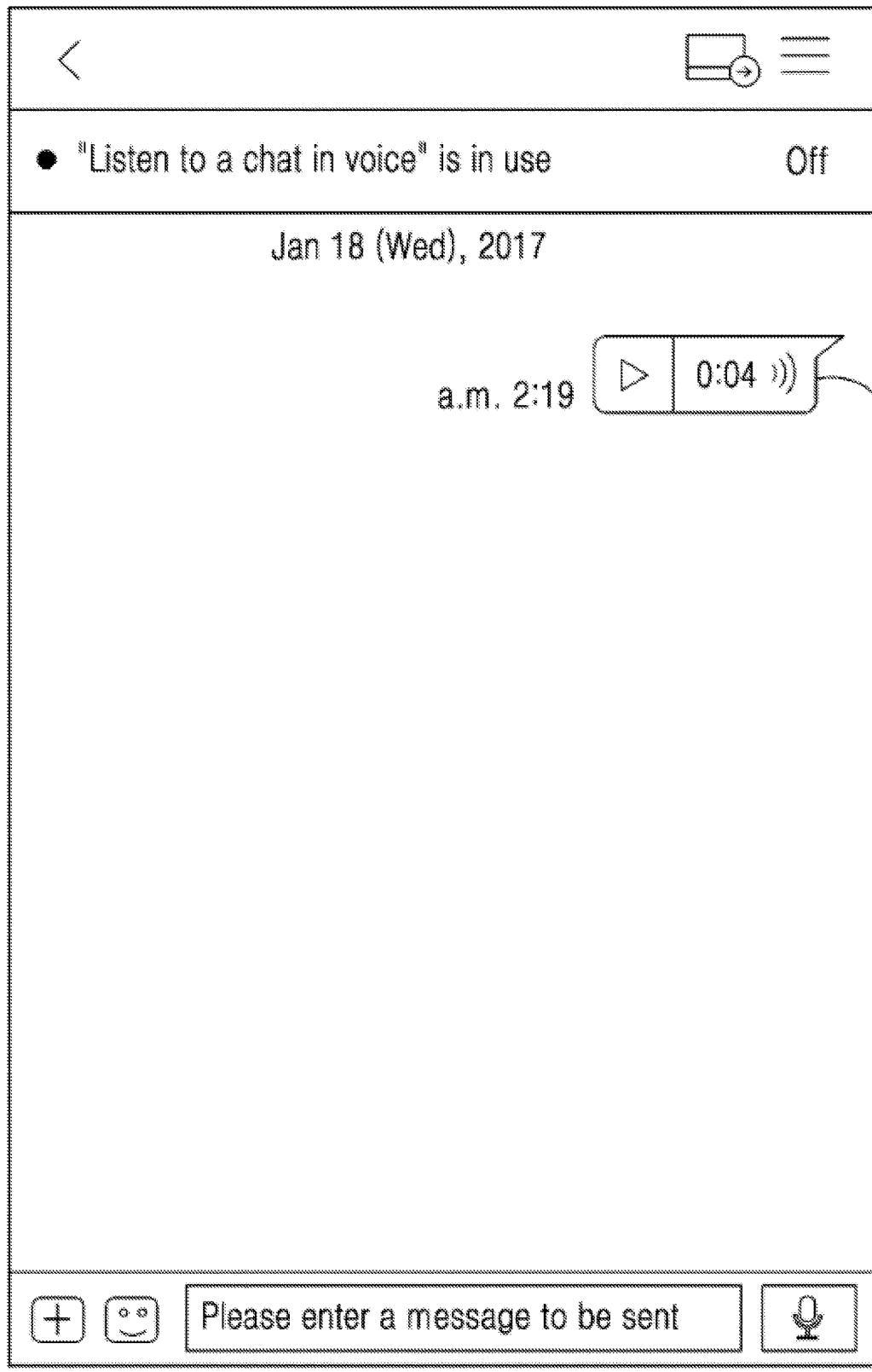
Figure 11:
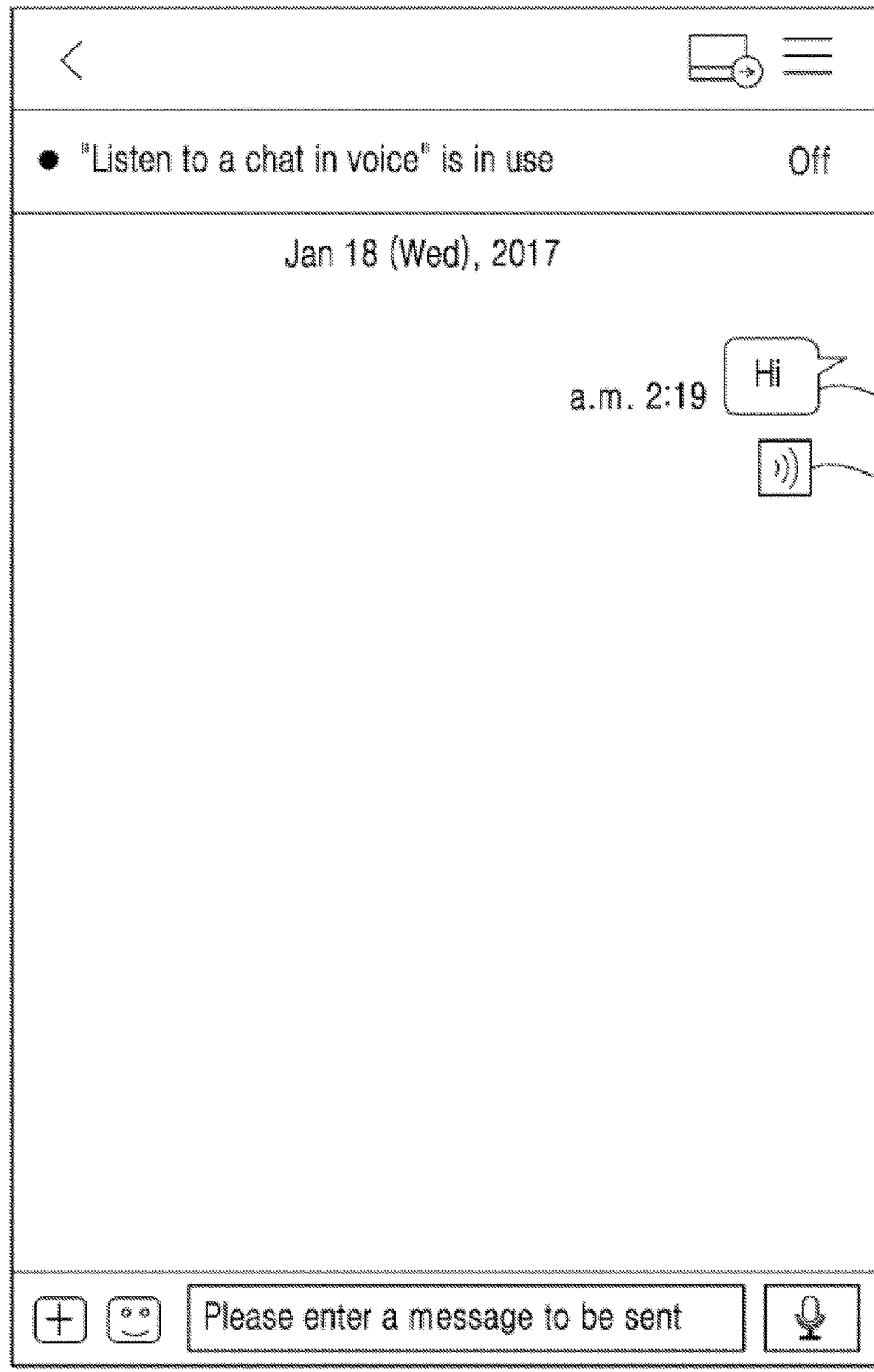

If the user of the mobile device 110 is connected to a specific chatroom, the user may verify a send message that is transferred from the external device 310 according to a specific protocol signal. For example, referring to FIG. 10, if the send message of the specific chatroom is transferred from the external device 310 as an audio file, the message processor 420 may display the send message using a message 1010 that includes an audio play button and an entire playtime in a speech message form. As another example, referring to FIG. 11, if the send message of the specific chatroom is transferred from the external device 310 as a text conversion result, the message processor 420 may display the send message using a text message 1110 corresponding to the text conversion result and may also display state information 1111 indicating that the corresponding text message 1110 is a text message converted from a speech. As another example, referring to FIG. 12, if an audio file and a text conversion result are transferred together from the external device 310 as the send message of the specific chatroom, the message processor 420 may display the send message using an integrated message 1210 that includes an audio play button and the entire play time with the message content. The message content may include text content corresponding to the text conversion result. If the text conversion result includes characters with a set length or more, only a portion of the text conversion result may be displayed and a "view full text" button 1211 for displaying the full message content may be included.

In response to pressing a specific button on the external device 310, the message processor 420 may start speech recording in the specific chatroom or may provide a query to the external device 120 to select another chatroom. If the user desires to select another chatroom, the message processor 420 may provide a list of chatrooms on a message application to the external device 310 and may set an interaction with the external device 310 with respect to a chatroom selected from the list of chatrooms and may perform a chat function using the external device 310 with respect to the selected chatroom.

Further, the at least one processor 212 may transfer an event from another app on the mobile device 110 to the message application and may provide a notification, such as speech recording start/end/cancellation, etc. The at least one processor 212 may exchange all Bluetooth signals with the external device 310 through a separate pairing for each application on the mobile device 110 with the external device 310.

According to one or more example embodiments, by pairing a specific chatroom within a message application with the external device 310, it is possible to immediately transmit a message received from the external device 310 to a counterpart as a send message of the specific chatroom based on a protocol signal desired and/or predefined with the external device 310 without using an interface of the chatroom. Also, although the user does not perform a manipulation using the interface of the chatroom, it is possible to output a message through the external device 310 immediately after the message is received.

According to one or more example embodiments, it is possible to perform a desired chat process in a specific chatroom on a mobile device using an external device paired with the mobile device. Also, according to one or more example embodiments, it is possible to transmit and receive a message through an external device without specifically manipulating a mobile device, such as a process of activating an application that is generally used to transmit and receive a message, a process of activating a chatroom in the application, and the like. Also, according to one or more example embodiments, it is possible to receive a message from an external device in a transmission mode using a separate protocol signal, not in an open channel state with the external device, and to apply the received message as a send message of a specific chatroom.

The units and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A chat method performed by a mobile device, the method comprising:
    selecting, using at least one processor, a first chatroom from a plurality of chatrooms, the selecting the first chatroom including enabling a voice chat function for the selected first chatroom, and the selecting the first chatroom further including a pairing operation between an external device and the mobile device;
    receiving, using the at least one processor, a request to transmit a send message, the request including the send message, in response to a desired button input of the external device;
    transmitting, using the at least one processor, the received send message to at least one counterpart mobile device that participates in the selected first chatroom;
    receiving, using the at least one processor, a received message through at least one chatroom of the plurality of chatrooms;
    determining, using the at least one processor, whether the at least one chatroom through which the received message was received is the selected first chatroom; and
    automatically outputting, using at least one processor, to the external device the received message using the enabled voice chat function based on results of the determining.

2. The method of claim 1, wherein
    the request is transmitted based on a desired protocol between the external device and the mobile device; and
    the receiving the request to transmit the send message comprises receiving the send message from the external device based on the desired protocol without using an interface associated with the selected first chatroom.

3. The method of claim 2, wherein the receiving the request to transmit the send message comprises:
    receiving from the external device speech data of the send message from a recording start point in time to a recording end point in time based on the desired protocol; or
    receiving from the external device speech data from the recording start point in time using a streaming communication scheme.

4. The method of claim 1, wherein the send message includes at least one of a speech message recorded at the external device, and a text message in which the speech message is converted to text.

5. The method of claim 1, wherein the send message includes a text message in which a speech message recorded at the external device is converted to text, and then translated into a desired language.

6. The method of claim 1, wherein the automatically outputting of the received message comprises outputting the received message through the external device without using an interface associated with the selected first chatroom.

7. The method of claim 1, wherein the automatically outputting of the received message comprises:
    converting the received message to a desired language; and
    transmitting the converted received message to the external device.

8. The method of claim 1, wherein
    the external device reads the received message based on a text-to-speech (TTS) scheme in response to the received message being a text; or
    plays the received message in response to the received message being a speech message.

9. The method of claim 1, further comprising:
    designating, using the at least one processor, the selected first chatroom in a message application executed on the mobile device; and
    performing the pairing operation between the external device and the mobile device using the message application.

10. The method of claim 9, further comprising:
    displaying, using the at least one processor, information associated with the pairing operation with the external device on at least one of a home screen of the message application and the selected first chatroom.

11. A non-transitory computer-readable recording medium storing computer readable instructions which, when executed by at least one processor, causes the at least one processor to perform a chat method in conjunction with a mobile device, the chat method comprising:
    selecting a first chatroom from a plurality of chatrooms, the selecting the first chatroom including enabling a voice chat function for the selected first chatroom, and the selecting the first chatroom further including a pairing operation between an external device and the mobile device;
    receiving a request to transmit a send message, the request including the send message, in response to a desired button input of the external device;
    transmitting the received send message to at least one counterpart mobile device that participates in the selected first chatroom;
    receiving a received message through at least one chatroom of the plurality of chatrooms;
    determining, using the at least one processor, whether the at least one chatroom through which the received message was received is the selected first chatroom; and
    automatically outputting, to the external device, the received message using the enabled voice chat function based on results of the determining.

12. A chat system of a mobile device, the chat system comprising:
    a memory having computer readable instructions stored thereon; and at least one processor configured to execute the computer readable instructions to,
- select a first chatroom from a plurality of chatrooms, the selecting the first chatroom including enabling a voice chat function for the selected first chatroom, and the selecting the first chatroom further including a pairing operation between an external device and the mobile device,
- receive a request to transmit a send message, the request including the send message in response to a desired button input of the external device,
- transmit the received send message to at least one counterpart mobile device that participates in the selected first chatroom,
- receive a received message through at least one chatroom of the plurality of chatrooms,
- determine whether the at least one chatroom through which the received message was received is the selected first chatroom, and
- automatically output, to the external device, the received message using the enabled voice chat function based on results of the determining.

13. The chat system of claim 12, wherein
the request is transmitted based on a desired protocol between the external device and the mobile device; and
the receiving the request to transmit the send message includes receiving the send message from the external device based on the desired protocol without using an interface associated with the selected first chatroom.

14. The chat system of claim 13, wherein the receiving the request to transmit the send message includes:
receiving from the external device speech data of the send message from a recording start point in time to a recording end point in time based on the protocol; or
receiving from the external device speech data from the recording start point in time using a streaming communication scheme.

15. The chat system of claim 12, wherein the send message includes at least one of a speech message recorded at the external device, and a text message in which the speech message is converted to text.

16. The chat system of claim 12, wherein the send message includes a text message in which a speech message recorded at the external device is converted to text, and then translated into a desired language.

17. The chat system of claim 12, wherein the automatically outputting the received message includes automatically outputting the received message through the external device without using an interface associated with the selected first chatroom.

18. The chat system of claim 12, wherein the automatically outputting the received message includes:
converting the received message to a desired language; and
transmitting the converted received message to the external device.

19. The chat system of claim 12, wherein
the external device reads the received message based on a text-to-speech (TTS) scheme in response to the received message being a text; or
plays the received message in response to the received message being a speech message.

20. The chat system of claim 12, wherein the at least one processor is further configured to:
designate the selected first chatroom in a message application executed on the mobile device; and
perform the pairing operation between the external device and the mobile device using the message application.

* * * * *